F. B. CONVERSE AND J. L. BUTLER.
METHOD OF MAKING ADHESIVE CORD STRIPS AND WINDING MECHANISM THEREFOR.
APPLICATION FILED JULY 11, 1918.
1,337,690.
Patented Apr. 20, 1920.
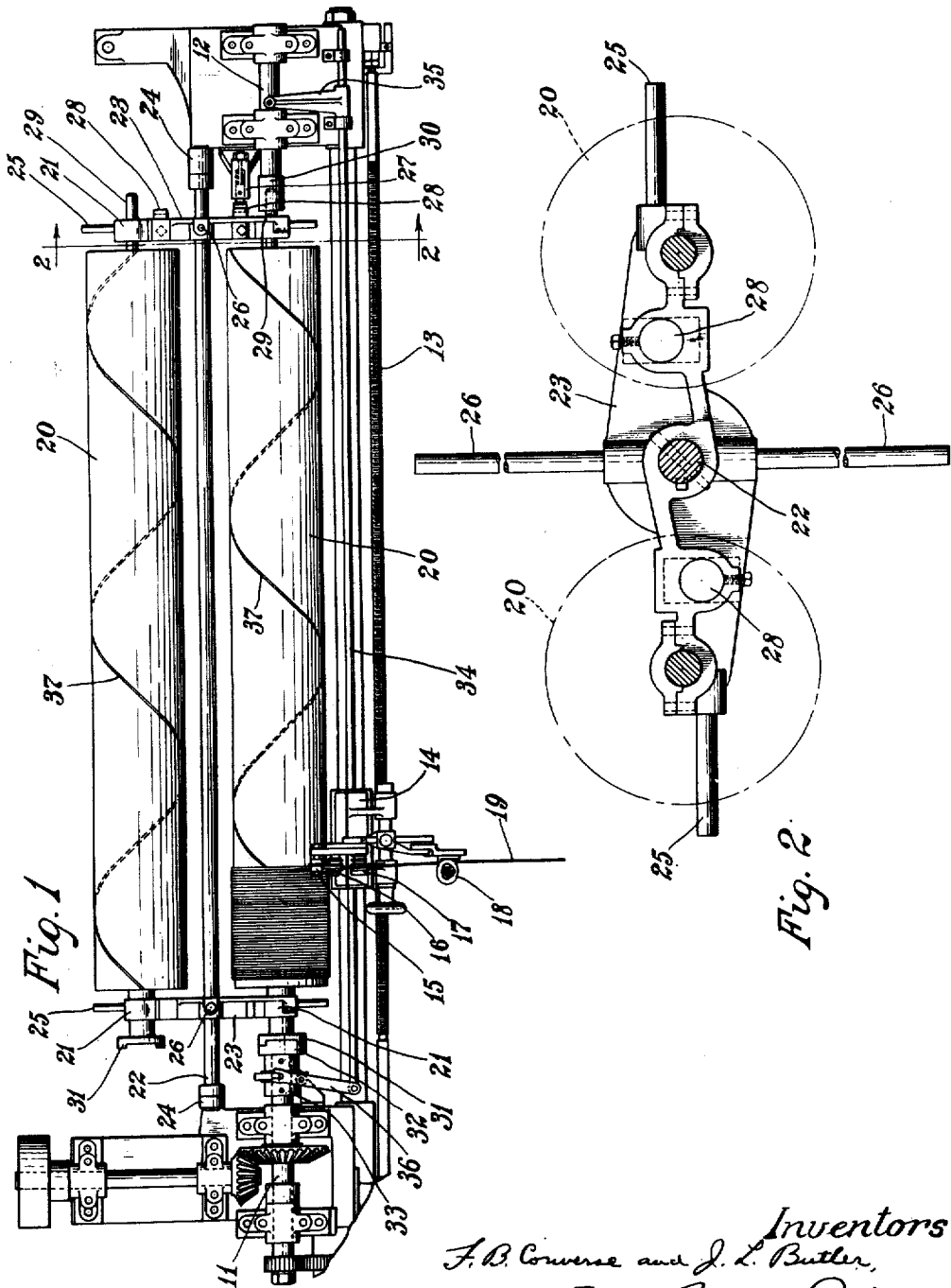
Inventors
F. B. Converse and J. L. Butler,
By Robert M. Pierson
Atty.

UNITED STATES PATENT OFFICE.

FRANCIS B. CONVERSE AND JAMES L. BUTLER, OF AKRON, OHIO, ASSIGNORS TO THE B. F. GOODRICH COMPANY, OF NEW YORK, N. Y., A CORPORATION OF NEW YORK.

METHOD OF MAKING ADHESIVE-CORD STRIPS AND WINDING MECHANISM THEREFOR.

1,337,690.   Specification of Letters Patent.   Patented Apr. 20, 1920.

Application filed July 11, 1918. Serial No. 244,475.

*To all whom it may concern:*

Be it known that we, FRANCIS B. CONVERSE and JAMES L. BUTLER, citizens of the United States, residing at Akron, in the county of Summit and State of Ohio, have invented a certain new and useful Method of Making Adhesive-Cord Strips and Winding Mechanism Therefor, of which the following is a specification.

This invention relates to means for making strips of rubberized cord to be used in the manufacture of pneumatic tires, and it relates more particularly to the method of winding the cord on a cylindrical drum or mandrel and cutting the cord-cylinder on a steep-pitched helical line to obtain the desired strip. Heretofore the practice has been to mount a single drum between the spindles of a lathe equipped with a screw feed, and, after winding a drum full of cord, either to slit the cord-cylinder and strip off the band while the drum remains in the lathe, or to take out the drum, remove it to a rack where the slitting and stripping are performed, and replace it with a fresh drum. In either case the winding operation is interrupted for a considerable period, and the capacity of the apparatus is correspondingly reduced. As the cord approaching the winding apparatus is sometimes passed through a tube machine for applying a plastic rubber coating to the cord, the stopping of the latter for any considerable period allows the rubber in the tube machine partially to set or vulcanize, which is undesirable. Our object is to increase the capacity of the winder and shorten the periods of stoppage of the cord, and to this end we provide an apparatus including a plurality of drums so mounted as to be capable of alternate connection with the lathe spindles, in order that one drum may be wound with cord while another is having the cord-cylinder slit and the strip removed therefrom.

Of the accompanying drawings,

Figure 1 is a plan view of a drum-winding apparatus constructed according to our invention.

Fig. 2 is a cross-section on the line 2—2 of Fig. 1.

In the drawings, 10 is the frame, 11 the live spindle or driver and 12 the tail spindle of an apparatus corresponding to a lathe and having a feed screw 13, the latter being driven in the usual manner by reversible gearing which is omitted in the drawing. 14 is a feed carriage operated by the screw 13 and provided with suitable guiding members 15, 16, 17, 18 over which the rubberized cord 19 is led onto the winding drum or mandrel 20.

There are two of the drums 20 loosely journaled in bearings 21 on a frame or turret composed of a horizontal shaft 22 and a pair of end plates 23, said shaft being parallel to the axis of the spindles 11, 12 and journaled in bearings 24 on the lathe frame. Handles or spokes 25, 26, projecting at right-angles from end plates 23, are provided for rotating the drum-holding frame, and a spring-catch 27, adapted to engage either one of a pair of notched studs 28 on the right-hand plate, registers the drums alternately in position for engagement with the lathe spindles.

Each drum 20 has its journal or bearing member 29 at one end extended to enter a socket or complemental bearing member 30 in the tail spindle 12 to center that end of the drum, and its journal at the other end is extended in the form of one member 31 of a jaw clutch or coupling, the other member 32 of which is mounted on a sliding sleeve 33 splined to the live spindle 11. Said sleeve and the tail spindle 12 are manually slidable in opposite directions by means of a stationarily-mounted longitudinal hand-rod 34 having at one end a fork 35 engaging the tail spindle, and at the other end a forked lever 36 fulcrumed on the lathe frame and engaging the coupling sleeve 33. This hand-rod and its connections, as will be seen, are mounted externally of the group of drums, and the rod extends the whole length of the machine on the front side thereof so as to be accessible to the operator when standing in front at either end to sever the cord and turn the frame or turret carrying the drums.

The periphery of each drum is provided with a helical groove 37 for guiding the point of the slitting knife, said groove being generally slanted at an angle of 45° to the cords.

In operation, one of the drums 20 will be coupled to the lathe spindles 11, 12 as shown in Fig. 1, and the feed carriage started to wind, for example, at the left-hand end of said drum. When it reaches the right-hand end the lathe is stopped and the end of the cord severed. The hand-rod 34 is then moved to the right to back off the coupling member 32 and the spindle socket 30, which leaves the holder or turret 22, 23 free to be reversed. By grasping the handles 25, 26 the operator turns said turret over so as to reverse the positions of the full and empty drums, and then shifts the hand-rod leftward so as to couple the spindles 11, 12 to the journals of the empty drum. The feed-carriage 14 being at the right, the cord is then wound on by a leftward progression of said carriage due to a reversal of rotation of the feed screw. While this drum is being wound, an operator at the back of the lathe slits the cord cylinder and peels off the resulting band or strip from the idle drum on that side and leaves it ready for re-winding. In this way the capacity of the lathe is greatly increased.

Various changes of embodiment may be made without departing from our invention.

We claim:

1. In a winding machine, the combination of a driver, a plurality of horizontally-mounted drums adapted to be alternatively coupled with said driver so that one drum is being rotated while another is free, a support for said drums adapted to be rotated to bring them alternately into position for engagement with said driver, a guide mounted to travel back and forth parallel with the drums to feed cord onto the driven drum, and externally mounted controlling means accessible from positions in front of the machine at both ends of the driven drum for engaging said drum with the driver and disengaging it therefrom.

2. In a winding machine, the combination of a horizontal driving spindle having an axially-movable clutch member, an alined tail spindle having an axially-movable bearing member, a plurality of horizontal drums each having at one end a clutch member for engagement with the driving clutch member and at its other end a bearing member for engagement with the bearing member on the tail spindle, a support for said drums adapted to be rotated to bring them alternately into alinement with the said spindles, means for guiding cord onto the driven drum, and a stationarily-mounted hand-rod extending longitudinally of the driven drum and accessible from positions at either end thereof for moving the clutch member on the driving spindle and the bearing member on the tail spindle simultaneously in opposite directions.

3. The method of making adhesive cord strips which comprises winding adhesive cord successively upon a series of alternately-presented rotary supports to make a series of tubes, slitting a wound tube to form a strip and removing said strip while another tube is being wound on another support.

In testimony whereof we have hereunto set our hands this 5th day of July, 1918.

FRANCIS B. CONVERSE.
JAMES L. BUTLER.